US005663798A

United States Patent [19]

Karrai

[11] Patent Number: 5,663,798
[45] Date of Patent: Sep. 2, 1997

[54] FAR-FIELD CHARACTERIZATION OF SUB-WAVELENGTH SIZED APERTURES

[75] Inventor: Khaled Karrai, Munich, Germany

[73] Assignee: Dr. Khaled Karrai und Dr. Miles Haines Gesellschaft burgerlichen Rechts, Munich, Germany

[21] Appl. No.: 625,870

[22] Filed: Apr. 1, 1996

[30] Foreign Application Priority Data

May 8, 1995 [EP] European Pat. Off. ............... 95106900
Jun. 6, 1995 [EP] European Pat. Off. ............... 95108673

[51] Int. Cl.$^6$ ..................................................... G01B 11/08
[52] U.S. Cl. .................................... 356/384; 250/559.24
[58] Field of Search ................................ 356/355, 384; 250/559.24

[56] References Cited

FOREIGN PATENT DOCUMENTS

| 0098578 | 1/1984 | European Pat. Off. |
| 0112401 | 7/1984 | European Pat. Off. |
| 0141251 | 5/1985 | European Pat. Off. |
| 0487233 | 5/1992 | European Pat. Off. |

OTHER PUBLICATIONS

Bethe, H.A., "Theory of Diffraction by Small Holes," *The Physical Review*, Second Series, vol. 66, Nos. 7 and 8, pp. 163–182 (Oct. 1 and 15, 1944).

Betzig, E., et al., "Breaking the Diffraction Barrier: Optical Microscopy on a Nanometric Scale," *Science*, vol. 251, pp. 1468–1470 (Mar. 22, 1991).

Bouwkamp, C.J., "On the Diffraction of Electromagnetic Waves by Small Circular Disks and Holes," *Philips Research Reports*, vol. 5, pp. 401–422 (Dec. 1950).

Bouwkamp, C.J., "Diffraction Theory," *Rep. Prog. Phys.*, vol. 17, pp. 35–100 (1954).

Meixner, V.J., et al., "Strenge Theorie der Beugung ebener elektromagnetischer Wellen an der vollkommen leitenden Kreisscheibe und an der kreisförmigen Öffnung im vollkommen leitenden ebenen Schirm," *Annalen der Physik*, 7, pp. 157–168 (1950).

*Primary Examiner*—F. L. Evans
*Attorney, Agent, or Firm*—Watts, Hoffmann, Fisher & Heinke, Co., L.P.A.

[57] ABSTRACT

A method and apparatus for determining the optical aperture diameter 'd' of tips suitable for use in near-field scanning optical microscopy (NSOM). Several functional relationships are found between the far-field angular intensity distribution function $I(\theta)$ for light of wavelength '$\lambda$' emitted out of the aperture, the angle '$\theta$' being that formed between the direction of travel of the photon concerned and the perpendicular to the plane of the aperture. It is found that $I(\theta)$ depends sensitively on the aperture 'd'. In one embodiment tip diameters can be measured for diameters in the range of $\lambda/6 < d < \lambda$.

18 Claims, 9 Drawing Sheets

Fig. 2A $\Phi = 90°$

Fig. 2B $\Phi = 0°$

FAR-FIELD CHARACTERIZATION OF SUB-WAVELENGTH SIZED APERTURES

FIELD OF THE INVENTION

The present invention relates to near-field optical microscopy. The invention provides a method and an apparatus for ascertaining information relating to the diameter of the optical aperture of a tip piece suitable for use in a near-field optical microscope.

BACKGROUND ART

In conventional far-field optical microscopy, the spatial lateral resolution is fundamentally limited to the order of the wavelength $\lambda$ of the radiation used. This fundamental diffraction limit is overcome in near-field scanning optical microscopy (NSOM) in which a sample is positioned in the near-field vicinity of a light source of size significantly smaller than $\lambda$. Such a microscope is described in EP-A-0 112 401.

A light source substantially smaller than the wavelength of the light used is therefore an essential element of a near-field optical microscope. Moreover, for a correct and satisfactory interpretation of images obtained with a near-field optical microscope, it is necessary to know the size of the sub-wavelength sized optical aperture used as the light source so that the image can be deconvolved from the tip response.

In many near-field optical microscopes currently in use, the light source is produced by a sub-wavelength sized circular aperture at the tip of a metal-coated tapered optical fiber. Such a light source is described for example in EP-A-0 487 233. Visible laser radiation can be ported in the optical fiber down to the aperture vicinity with sufficient efficiency to provide photon throughput in the nanowatt range. Such optical apertures, used as a local light source, have been made with diameters as small as 40 nm. In NSOM, the lateral spatial resolution is no longer limited to the wavelength of the probe light '$\lambda$' but is rather of the order of the diameter $d=2a$ of the local source. Subwavelength resolution can be obtained when the object is placed within the depth of field of the local source. For subwavelength sized apertures, this depth of field is of the order of the aperture diameter.

Most present day near-field optical microscopes operate at visible wavelengths i.e. $\lambda=400–1000$ nm and have tips with aperture diameters 'd' lying in the range of approximately $d=50–300$ nm. The upper limit to the tip diameter is generally dictated by the fact that the tip diameters need to be significantly lower than $\lambda$ to warrant the use of a scanning microscope as opposed to a conventional optical microscope. The lower limit to the tip diameter is generally dictated by fabrication problems, since, at the present time, it is difficult to make usable tips with diameters lower than around 50 nm with optical fiber pulling techniques. Therefore the majority of tips currently used have diameters in the range of approximately $\frac{1}{10}\lambda<d<\lambda$.

To establish the size of the aperture, it is usual to perform measurements with a scanning electron microscope (SEM). This is time consuming and requires the use of an SEM, which is a costly piece of capital equipment. Moreover, use of an SEM requires experience and skill. Tips for NSOM are currently sold for prices of the order of $100 whereas SEM characterisation of a tip would cost many times more. An SEM measurement is thus unsuited to a commercial environment. Even in a research environment, many workers active in NSOM do not have the financial and human resources to be able to perform SEM measurements.

Up to now, there has been no simple, quick and reliable way of measuring the optical aperture size of a tip for NSOM.

OBJECTS OF THE INVENTION

An object of the present invention is to provide a simple and convenient characterization method for providing information about the size of the optical aperture of a source for near-field optical radiation. A further object is that such a method should be suitable for application in a commercial environment. A still further object is to provide an apparatus suitable for performing the method. Yet another object is that such an apparatus should be comparitively simple and inexpensive in comparison to an SEM.

It is an ancillary object of this invention to provide a method of and an apparatus for ascertaining information relating to the size of the optical aperture of a source for near-field optical radiation for tips having diameters in the range of $\frac{1}{10}\lambda<d<\lambda$.

SUMMARY OF THE INVENTION

The realisation that lead me to the present invention was that the angular far-field intensity distribution of monochromatic radiation transmitted through a diffracting aperture must, at least in principle, be a function of the diameter $d=2a$ of the optical aperture of that tip. I then thought that, if this were the case, it might be possible to to ascertain information about the size of the aperture from an analysis of the far-field intensity distribution.

After much theoretical and experimental work conducted in parallel, I arrived at the following methods and apparatuses.

In first and second aspects of the invention, respective methods are provided for application to a tip piece suitable for use in near-field optical microscopy. The tip piece has a proximal end and a distal end, there being an optically transmissive aperture of a diameter to be characterised situated at the proximal end of the tip piece. The tip piece is of the type which allows input light to be coupled into its distal end which then passes through the tip piece and is emitted from the proximal end as output light distributed in far field over an angular intensity distribution function.

The method of the first aspect comprises the steps of: (a) coupling in input probe light of a preselected wavelength into the distal end; (b) obtaining a first datum from a first far-field intensity measurement of the output light emitted at a first preselected angle from the aperture; (c) obtaining at least a second datum from at least a second far-field intensity measurement of the output light emitted at at least a second preselected angle from the aperture, the second preselected angle being different from the first preselected angle; and (d) deducing dimensional information relating to the diameter from the first and the at least second data by applying them to a predetermined function relating the far-field angular intensity distribution function to tip diameter.

The method of the second aspect is the same as that of the first aspect in respect of steps (a), (b) and (c), but step (d) involves deducing dimensional information relating to the diameter from the first and the at least second data by applying them to a predetermined function relating the far-field angular intensity distribution function to diameter, wherein the predetermined function relates the full width of the angular intensity distribution function at a preselected proportion of the maximum value of the angular intensity distribution function to tip diameter.

In the best mode of the first and second aspects, the predetermined function relates the full width half maximum (FWHM) of the far-field intensity distribution function to aperture diameter.

In preferred variations of the first and second aspects, the input and/or the output light can be polarised. When both input and output light are polarised, the polarisation directions can beneficially be set mutually parallel or mutually perpendicular.

In third and fourth aspects of the invention, respective apparatuses are provided for analysing tip pieces suitable for use in near field optical microscopy. The tip pieces to be analysed have a proximal end and a distal end, with an optically transmissive aperture of a diameter to be ascertained situated at the proximal end of the tip piece.

The test apparatus of the third aspect comprises: a holder for holding the tip piece so as to position the aperture at a prespecified location in relation to the test apparatus; a light source for generating input light of a preselected wavelength; coupling-in means for coupling the input light into the distal end of the tip piece, the input light passing through the tip piece and being emitted from the proximal end as output light; a detector for detecting the intensity of the output light emitted at a given angle from the aperture and generating a corresponding signal indicative thereof, motor means for moving the detector to different angles around the location; data acquisition means for receiving the signal from the detector and correlating the signal with the angle at which it was measured so as to generate angular intensity data; and processing means for deducing dimensional information relating to the aperture diameter of the a piece from the angular intensity data by applying the intensity data to a predetermined functional relationship between a characteristic of the angular intensity distribution function and tip diameter.

The test apparatus of the fourth aspect comprises: a holder for holding the tip piece so as to position the aperture at a prespecified location in relation to the test apparatus; a light source for generating input light of a preselected wavelength; coupling-in means for coupling the input light into the distal end of the tip piece, the input light passing through the tip piece and being emitted from the proximal end as output light; a first detector for detecting the intensity of the output light emitted at a first preselected angle from the aperture and generating a corresponding first signal indicative thereof, at least a second detector for detecting the intensity of the output light emitted at a second preselected angle from the aperture and generating a corresponding second signal indicative thereof, the second preselected angle being different from the first preselected angle; data acquisition means for receiving at least the first and second signals from the first and second detectors respectively so as to generate angular intensity data; and processing means for deducing dimensional information relating to the aperture diameter of a tip piece from the angular intensity data by applying the angular intensity data to a predetermined functional relationship between a characteristic of the angular intensity distribution function and diameter.

In preferred variations of the third and fourth aspects, polarising means can be provided for polarising the input and/or the output light. When means are provided for polarising both the input and the output light, they can be beneficially arranged such that the polarisation directions of the input and output light are mutually parallel or mutually perpendicular.

As will be appreciated from the above, the tip aperture size information can thus be ascertained with a simple optical measurement which can be performed quickly in a relatively inexpensive and uncomplicated manner. Moreover, in contrast to an SEM measurement, the measurement of the invention can be fully automated without difficulty.

BRIEF DESCRIPTION OF THE DRAWINGS

The invention is described below with the aid of the following figures.

FIGS. 8A and 8B Schematic illustrations each showing the orientation of the magnetic dipole M and the electric dipole P relative to each other and relative to the plane of the aperture, indicated with the circular disc: in FIG. 8A for the theory of Bethe; and in FIG. 8B according to the phenomenological theory of the invention.

DETAILED DESCRIPTION

Apparatus

Figure 1A:
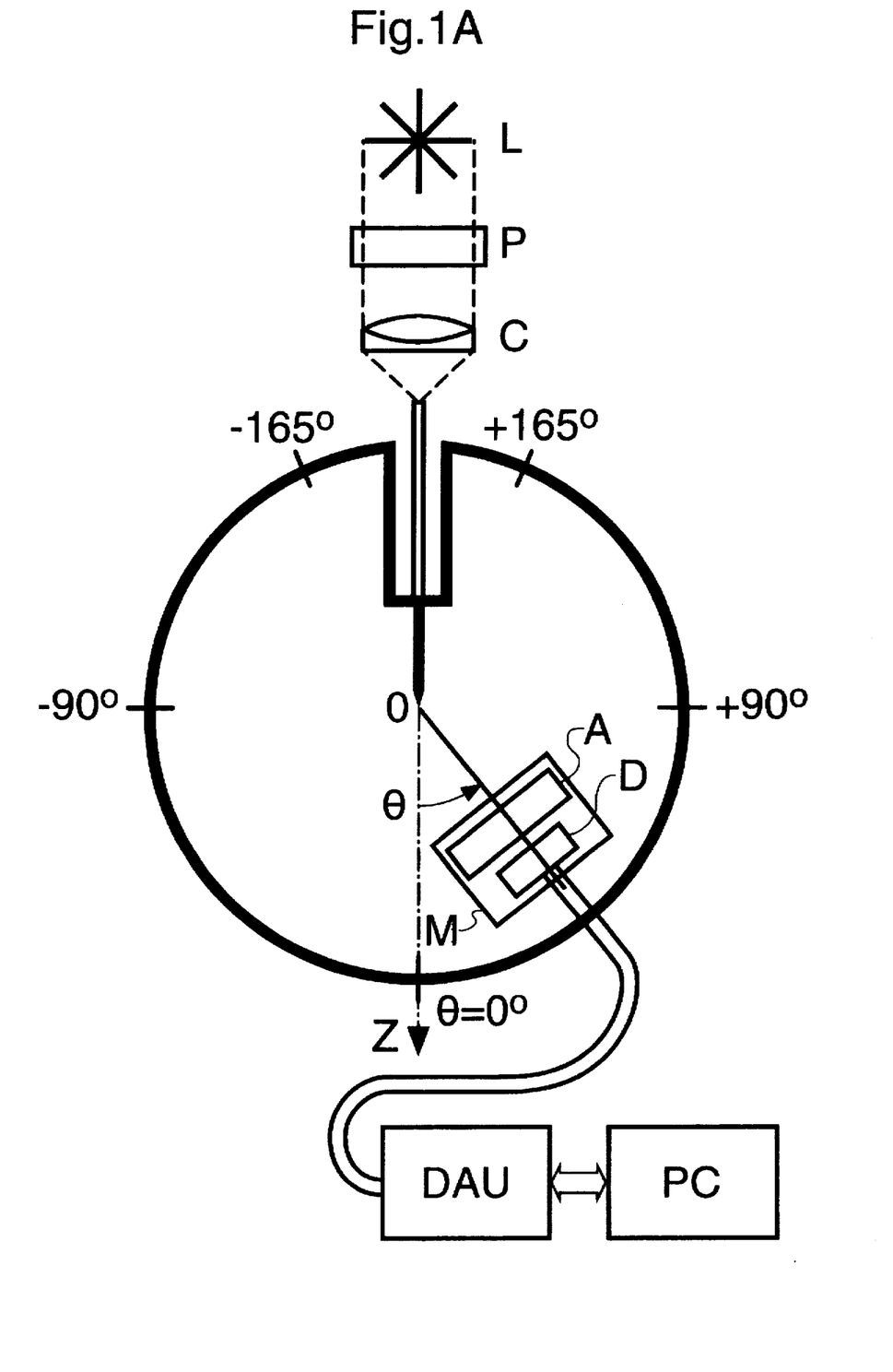
FIG. 1A Schematic view of the apparatus of a first embodiment of the invention.

A first embodiment of an apparatus in accordance with the invention is shown schematically in FIG. 1A. This apparatus can be used to measure the far-field angular dependence of the light intensity transmitted through an aperture such as a metal-coated tapered optical fiber tip and thus to perform the method of the invention.

As shown in FIG. 1A, the radiation of a helium-neon laser source L ($\lambda$=632.8 nm) is linearly polarized with a polarizer P and coupled with a lens arrangement C into the cleaved end of a monomode optical fiber. The light is ported through the fiber to the aluminum-coated tapered optical fiber tip located at the position O in the center of the arcuate path described by the polarization analyser A and detector D. The transmitted light is collected through a linear polarizer A (the analyzer) and detected with a PIN photodiode D as a function of the angle $\theta$.

The detector D delivers an electrical signal in the form of a voltage or current which is fed via a connection line to a simple chart recorder or to an analog-to-digital converter for further processing by a computer or other data acquisition unit.

As shown in FIG. 1A, the experimental apparatus of the first embodiment uses a PIN semiconductor photodetector D scanned along an arcuate path having the tip aperture at its center and a radius R=5 cm. Any other suitable detector of the electromagnetic radiation ported through to the aperture can also be used. A PIN detector has the advantage of being uncostly and easy to use. The detector path was free for a range of angles $\theta$ of between $-165°$ and $165°$ with the zero angle being defined by straight-ahead propagation out of the optical fiber. The angular resolution in $I(\theta)$ is adjustable from $0.3°$ to $3°$ depending on the numerical aperture (f-number) of the detector. A linear polarizer functions as an analyzer A and is placed in from of the detector D. The linearly polarized light of the $\lambda$=633 nm HeNe laser L is launched into the optical fiber with an intensity of 1 mW. The light intensity emitted from the aperture ranged from 1 to 100 nW for aperture sizes in the range from d=2a=60 to 200 nm and was in the microwatt range for larger apertures. The tips were found to preserve the linear polarization of the incoming light to better than 97% for the whole range of the aperture diameter. The light intensity detected at the PIN photodiode D is measured using standard lock-in detection techniques. A DC measurement could also be used. The whole angular measurement apparatus was placed in a dark enclosure in order to avoid photon signal extrinsic to the aperture transmission. The fiber was inserted in an opaque tube as indicated highly schematically in FIG. 1A so that the detector would not be exposed to parasitic light scattering occurring within the fiber.

In a manual version of the first embodiment of the apparatus, the detector D and analyser A are jointly rotated around the arcuate path by hand. The value of the angle $\theta$ is then obtained by reading off the angle from a conventional mechanical scale, for example a vernier scale.

In a semi-automated version of the first embodiment, the detector D and the analyser A are rotated around the arcuate path with the aid of a motor M such as a micrometer motor, encoder micrometer motor, stepper motor or the like. The detector is then set manually to a position at the start of a scan, for example at $\theta$=$-164°$. The output signal line from the detector D is connected to a conventional chart recorder. The chart recorder and the detector/analyser unit are then set running. A scan of $I(\theta)$ over a desired angular range is then obtained. This version has the advantage of being more automated than the manual version yet still very simple.

In an automated version of the first embodiment, as shown in FIG. 1A, the detector D and the analyser A are rotated around the arcuate path with the aid of a motor M such as a micrometer motor, encoder micrometer motor, stepper motor or the like. The motor is controlled by a computer or other electronic control unit ECU. After suitable calibration, the apparatus can then be driven to any desired value of the angle $\theta$ and the intensity value $I(\theta)$ measured at that angle. The signal from the detector D is fed into computer or other data acquisition unit DAU via an analog-to-digital converter. The ECU and DAU are preferably in communication with one another and in particular are preferably incorporated into the same computer. The computer PC is then programmed with appropriate software to allow all the desired functions to be performed by the user via the computer's user interface. For example, functions such as: move detector to angle $\theta$; measure intensity at the current angle $\theta$; perform a scan of $I(\theta)$ between angles $\theta 1$ and $\theta 2$; find angle of maximum intensity; find the two angles of half maximum intensity and thus the FWHM etc.

Figure 1B:
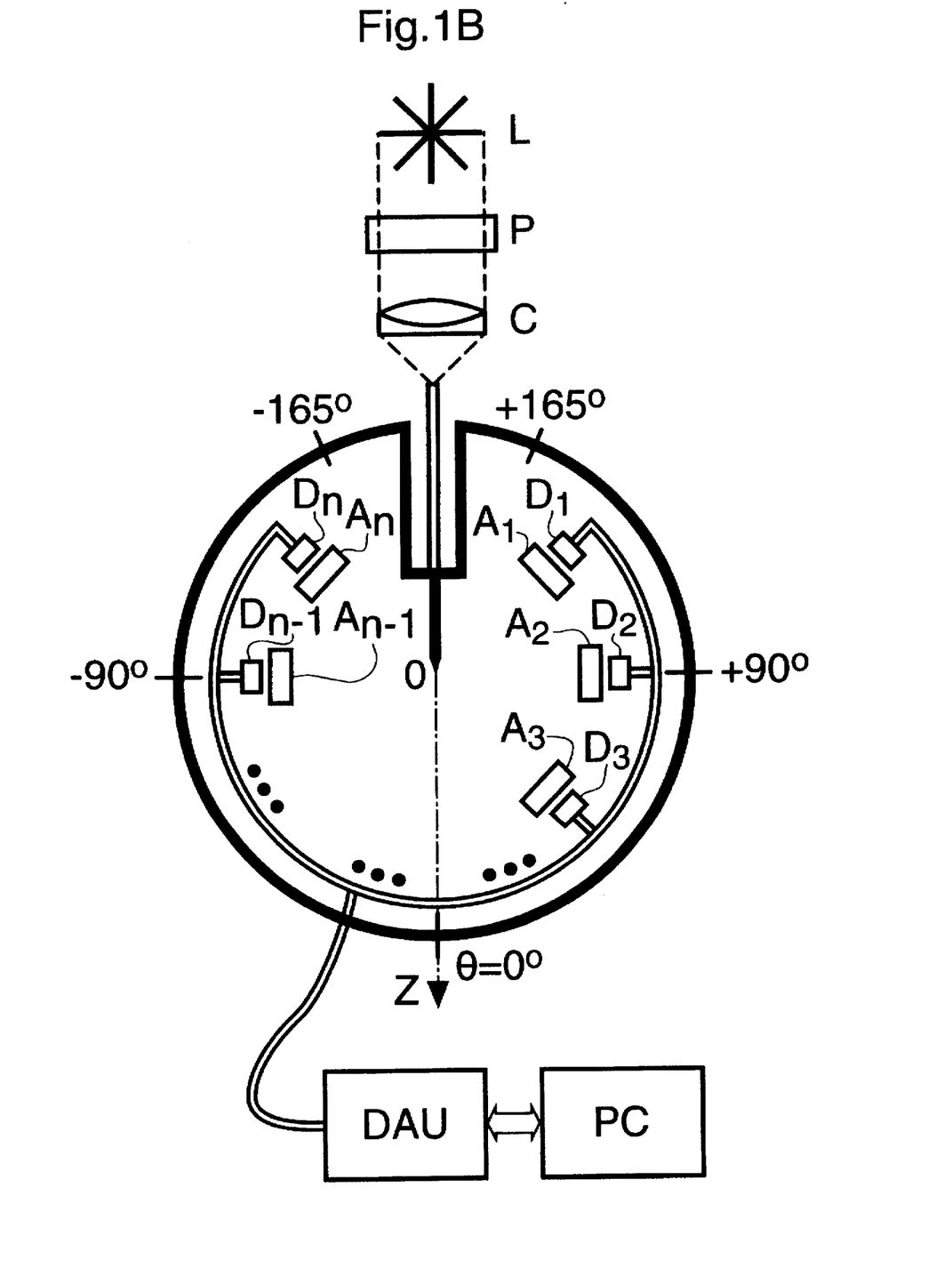
FIG. 1B Schematic view of the apparatus of a second embodiment of the invention.

In a second embodiment of the apparatus of the invention, as shown in FIG. 1B, a plurality of detectors D and associated analysers A are provided, denoted $D_1$, $D_2$, $D_3$, ... $D_n$ and $A_1$, $A_2$, $A_3$, ... $A_n$ respectively. Each detector $D_n$ provides a signal which is fed to an electronic data acquisition unit DAU via a connection line. The detectors and associated analysers are placed angularly distributed around the center point O. For example, 34 detectors and analysers can be placed at regular $10°$ angular intervals around the point O from $\theta$=$-165°$ to $+165°$. Alternatively, the detectors and analsers can be placed over a limited angular range from, for example, $\theta$=$-70°$ to $+70°$. As will be understood after having read the discussions further below, such a range is particularly suited to a preferred embodiment of the method of the invention since it would always be sufficient to measure the FWHM of $I(\theta)$ in the $\Phi$=$90°$ configuration. In particular, if the method to be performed by the apparatus is to measure the FWHM, the angular distribution of the detectors need not be regular, but instead detectors can be clustered around preselected angular regions. Suitable detector arrays are, for example, charged coupled devices (CCD) or multi-channel plates (MCP). Each individual detector $D_n$ is then a pixel or group of pixels of the array detector.

The particular advantage of the second embodiment is that it obviates the need to have to rotate the detector D. The rotation stage and associated gears, drives, bearings etc. are thus all dispensed with. Moreover, the apparatus is calibration free with respect to the angular values $\theta$ since the detector positions can be fixed once and for all on assembly of the apparatus.

Measurements

The apertures measured were formed at the apex of a metal-coated tapered optical fiber tip. Tips of this kind have become the standard type of source for near-field optical microscopes. The physical principles and experimental findings in the following are however quite general and can for example be applied equally well to near-field optical microscopes which use micropipette tips as well as to tapered tips used for other applications.

The tapered metal-coated fiber tips used for this work were prepared by melting and pulling monomode optical fibers having a 3.2 μm core diameter and 125 μm cladding according to the technique outlined in E. Betzig, J. K. Trautman, T. D. Harris, J. S. Weiner and R. L. Kostelak, Science, 251, 1468 (1991). For this purpose, we have made use of a commercial pipette puller fitted with a 20 watt $CO_2$ laser. An aluminum film of 120 nm thickness is evaporated onto the side of the tapered tips using a technique outlined in Betzig, Trautman et al ibid so as to leave the apex of the tips uncoated.

The tip aperture diameters quoted throughout are values determined from SEM micrographs. For example, one particular tip is measured to have a diameter d=161 nm and in the micrograph, the aperture itself and the surrounding aluminum coating being clearly visible. From the micrograph, the aluminum coating is deduced in this particular example to have a thickness of 120 nm and the tip taper angle is deduced to be 32°. This particular aperture allowed a photon throughput of up to 80 nW (for λ=633) and maintained linear polarization of up to 97%.

The geometry of the present experimental measurement is defined as follows with reference to FIG. 1A. The tip axis is aligned along Z so that the circular aperture lies in the plane XY perpendicular thereto. The electric field polarization of the outcoming radiation lies in the plane XZ. The angle θ is the angle between the tip axis Z and the detector direction. When the angle θ is equal to zero, the detector faces the aperture of the tip. When the angle θ is equal to 90° the detector lies in the plane XY of the aperture. The angle Φ is the angle between the plane in which the detector is scanned and the plane of the electric field polarization of the transmitted radiation. The angles θ and Φ are defined in spherical coordinates.

Figure 2A:
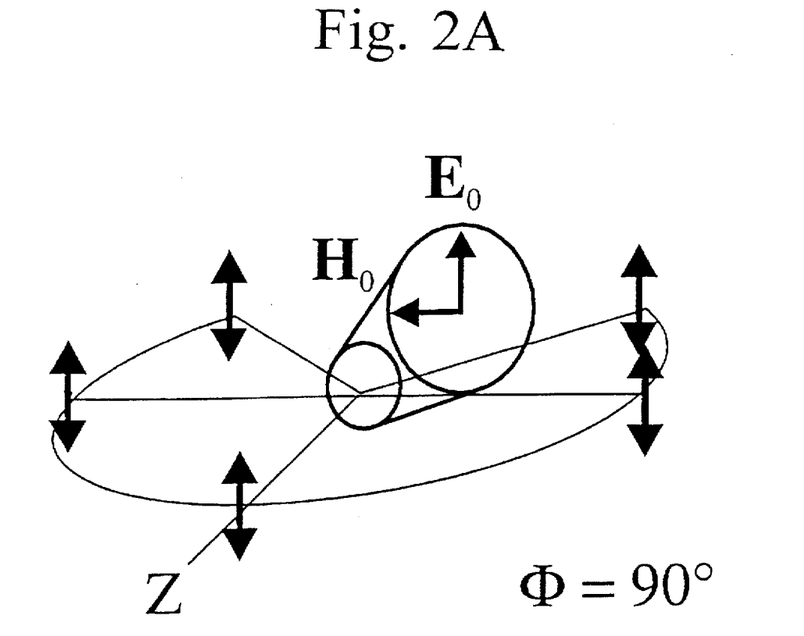
FIGS. 2A and 2B Showing the two different transmitted light polarization configurations $\Phi=90°$ and $\Phi=0°$ of the angular scan respectively. The double arrows symbolize the electric field orientation of the linear polarizers 'A' shown in FIGS. 1A and 1B.
Figure 2B:
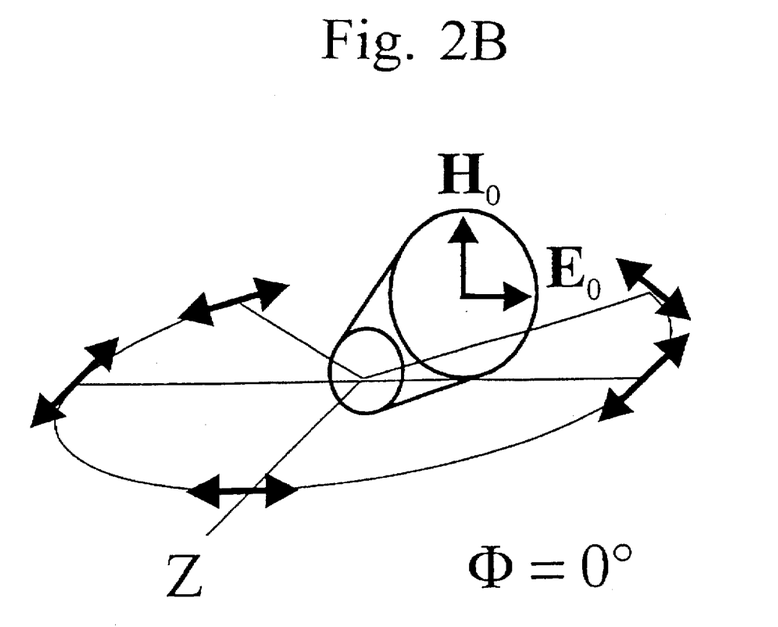

The transmitted photon intensity I(θ) is measured as a function of the angle θ at constant Φ. For axially symmetric tips, it is in fact sufficient to measure I(θ) at Φ=0 and at Φ=90° in order to generate any arbitrary I(θ,Φ) dependence of the transmitted intensity. The Φ=90° and at Φ=0° scan geometries are schematically illustrated in FIGS. 2A and 2B respectively. As can be seen, in the case of Φ=0, the detector travels in the plane of polarization XZ, whereas, in the case of Φ=90°, the detector travels in the plane YZ perpendicular to the plane of polarization.

Theoretical Background

To interpret the measurements it is instructive to first discuss some known theories. A known theoretical problem is the prediction of the angular distribution of light from a circular light-transmitting disc of diameter d=2a in an infinitely thin two-dimensional sheet which is perfectly conducting and of infinite planar extent. Clearly, an NSOM tip is not the same, since the reflective coating shrouding the tip aperture is of conical shape and not flat. The reflective coating follows the extremity of the extruded fiber or micropipette, and does not lie in a plane. Nevertheless, these theories at least help provide an introduction to the present problem and define convenient mathematical notation.

The theoretical problem of predicting the angular distribution of light emitted from a circular aperture of diameter d=2a lying in an infinitely thin two-dimensional perfectly conducting screen has been treated rigorously and formally by I. Meixner and W. Andrejewski, Ann. Phys. 7, 157 (1950). The exact solution of this apparently simple problem is in fact rather complicated. The solution is expressed in intricate series of spheroidal functions whose rate of convergence depends on 'ka', where k=2π/λ is the wave vector.

However, for the important range of 0.5<ka<2.0 (i.e. approx. ⅙λ<d<⅔λ) the theory of Meixner and Andrejewski fails to quantitatively describe our experimental measurements from the aperture of a tapered optical fiber tip. I established this by solving the equations set up by the theory of Meixner and Andrejewski numerically and comparing the result with our experiments. The theory of Meixner and Andrejewski is of no practical use for ascertaining information relating to the diameter of a tip aperture suitable for NSOM.

I now considered the theoretical situation for two limiting cases namely ka>>1 and ka<<1 of the general theory, that is to say d>>λ and d<<λ respectively. The limiting case of ka>>1 is covered by the theory of Kirchoff and the limiting case of ka<<1 is covered by the theory of Bethe (see H. A. Bethe, Phys. Rev. 66, 163 (1944).

Large aperture limit d>>λ (ka>>1): Kirchhoff

For uniform electromagnetic fields normally incident on the screen, the limiting case of large apertures (i.e. ka>>1) reduces to the result of Kirchhoff's scalar theory. In this limiting case the normalized angular dependence of the far-field intensity is given by $$I_{Kir}(\theta) = \{2J_1(\xi)/\xi\}^2$$

where $J_1$ the Bessel function of the first kind and $\xi$=(ka)sin (θ). The angle θ spans the range between the direction Z normal to the aperture plane and the direction leading from the aperture to the detector D as shown in FIG. 1A (left panel).

The full width at half maximum (FWHM) of I(θ), which we denote as $2\theta_{1/2}$, is obtained by solving $$I_{Kir}(\theta_{1/2}) = \frac{1}{2}$$

which leads to $$2\theta_{1/2} = 2\arcsin(1.6163/ka) \approx 3.233/ka$$

Kirchoff's theory thus predicts a dependence of the FWHM ($2\theta_{1/2}$) on aperture diameter (ka) such that $2\theta_{1/2}$ increases with reducing aperture diameter until a saturation is reached at θ=90° for ka=0.

This is an encouraging result since, although it does not relate to sub-wavelength sized apertures, it indicates a dependence of the intensity distribution on aperture size.

Small aperture limit d<<λ (ka<<1): Bethe

The small aperture limit (i.e. ka<<1) of the problem of light transmission through a circular aperture in a planar sheet as described above, is dealt with in H. A. Bethe, Phys. Rev. 66, 163 (1944). Although Bethe's solution has proved to be wrong in the near-field range [see C. J. Bouwkamp, Philips Res. Rep. 5, 401(1950)], it is correct in the far-field limit [see C. J. Bouwkamp, Rep. Prog. Phys. 17, 35 (1954)].

The main conclusion of Bethe's theory is that, in the limit of ka<<1, the far-field radiation distribution from the aperture is identical to that of a combination of two radiating dipoles located at the center of the aperture (see Bethe and Bouwkamp 1954 ibid).

One of these dipoles is an in-plane magnetic dipole M antiparallel to the magnetic field component $H_0$ of the radiation falling on the screen. The other of these dipoles is an electric dipole P directed along $E_{0\perp}$ the incoming radiation electric field component perpendicular to the screen.

In the particular case of a plane wave at normal incidence, $E_{0\perp}$=P=0, the radiation reduces to that of a single magnetic radiating dipole, leading to $$I^\parallel_{Bethe}(\theta) = \cos^2(\theta)$$

when the detector is scanned in a plane containing M, this configuration being defined as Φ=0° further below and to $I^\perp_{Bethe}=1$ when the detector is scanned in the plane perpendicular to M, this configuration being defined as Φ=90° further below.

The FWHM of I(θ) denoted as $2θ_{1/2}$ is obtained by equating $$I^{\|}_{Bethe}(θ_{1/2})=\cos^2(θ_{1/2})=½$$

which leads to $$2θ_{1/2}=90°$$

Bethe's theory thus predicts that the FWHM is independent of aperture diameter. Therefore, according to Bethe's theory, a far-field measurement of the angular distribution of a tip suitable for NSOM would not provide any information about aperture diameter thus indicating that my original idea of using a far-field measurement to measure the aperture size of a tip suitable for NSOM could not work.

Results

The results of measurements of the angular intensity distribution function I(θ) are now described by means of example with reference to three tips, one having a relatively large diameter of 3.2 μm, one having an intermediate diameter of d=380 nm and one which has the smallest diameter that we have measured of d=60 nm. These three aperture sizes were chosen to give a representative picture of the behaviour of I(θ) as a function of 'd'. In contrast to all the other apertures measured which were produced by fiber pulling as described above, the 3.2 micron aperture was obtained from a flat cleave of an optical fiber, the aperture size being essentially determined by the core diameter of the fiber (i.e., it is not a tapered tip).

Figure 3:
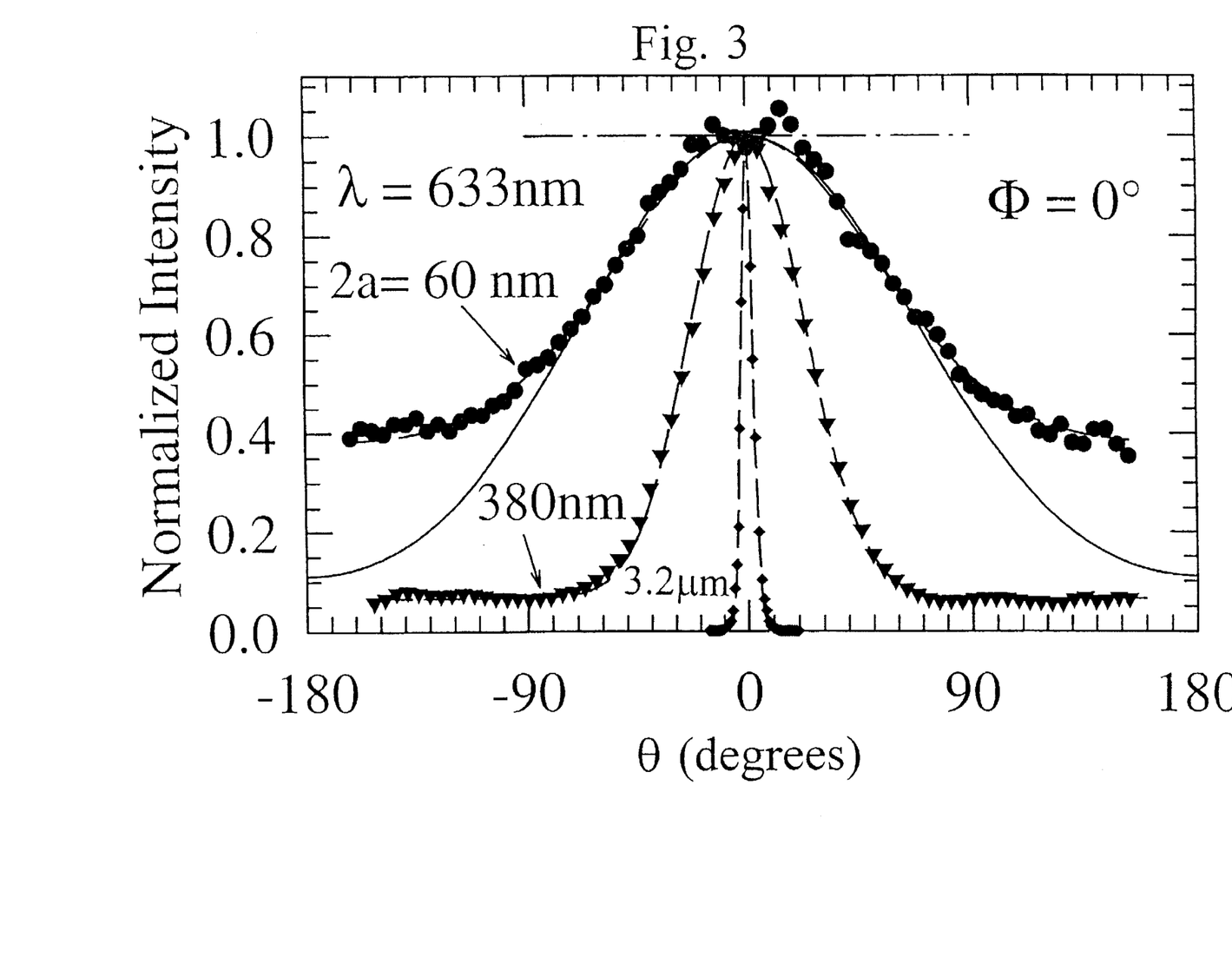
FIG. 3 Normalized angular dependence of the transmitted intensity $I(\theta)$ measured for aperture diameters of $d=60$ nm ($ka=0.30$), $d=380$ nm ($ka=1.89$) and $d=3.2$ mm ($ka=15.9$). The detector is scanned in the plane of the polarization ($\Phi=0$). The dash-dotted line spanning the range $-90°$ to $90°$ corresponds to Bethe's theory. The dashed lines corresponds to the best gaussian fit. The full line corresponds to the case of a magnetic and an electric radiating dipoles of strength 2 and 1 respectively and oriented perpendicular to each other in the plane of the aperture.

Results for the scans of I(θ) taken in the Φ=0 configuration are shown in FIG. 3.

As expected from the specification of the monomode fiber, the light emitted from the flat cleaved aperture with the 3.2 micron diameter is transmitted forward in a relatively narrow solid angle of the order of 10°. The FWHM of I(θ) is measured to be $2θ_{1/2}$=5.36°. The intensity I(θ) is maximum for θ=0 i.e. for direct forward propagation measured when the detector faces the aperture. The intensity distribution function I(θ) is very accurately fitted with a gaussian curve. The signal level falls to the noise background level, i.e. zero, when |θ| exceeds 15°.

For the aperture with a diameter of 380 nm, the angular distribution I(θ) is much broader than for the 3.2 micron aperture. Remarkably, a finite signal is measured for |θ|>90° i.e. for backwards propagation of light transmitted through the aperture. The intensity distribution is well described by a summation of a gaussian contribution and a constant background contribution, which for the 380 nm aperture corresponds to 6.6% of the maximum intensity of the signal i.e. the signal for direct forward propagation at θ=0°. The gaussian shape has a full width centered around θ=0° which approximately covers the full range of forward propagation −90°<θ<90° and the signal for backwards propagation is the above-mentioned constant background.

FIG. 3 also shows the results for the aperture of 60 nm diameter. This is the smallest aperture we have measured to date. In comparison to the 380 nm diameter aperture, I(θ) has broadened further and the background signal contribution increased in intensity in relation to the gaussian signal contribution. In this case the background signal contribution is 38% of I(θ=0) showing that a large proportion of the photon intensity propagates in backward directions.

Bethe's prediction is that $I^{\perp}_{Bethe}$=1 for −90°≤θ≤90° and is shown by the chain-dotted horizontal line in FIG. 3 and, as can be seen, is in complete discrepancy with the experimental data.

Figure 4:
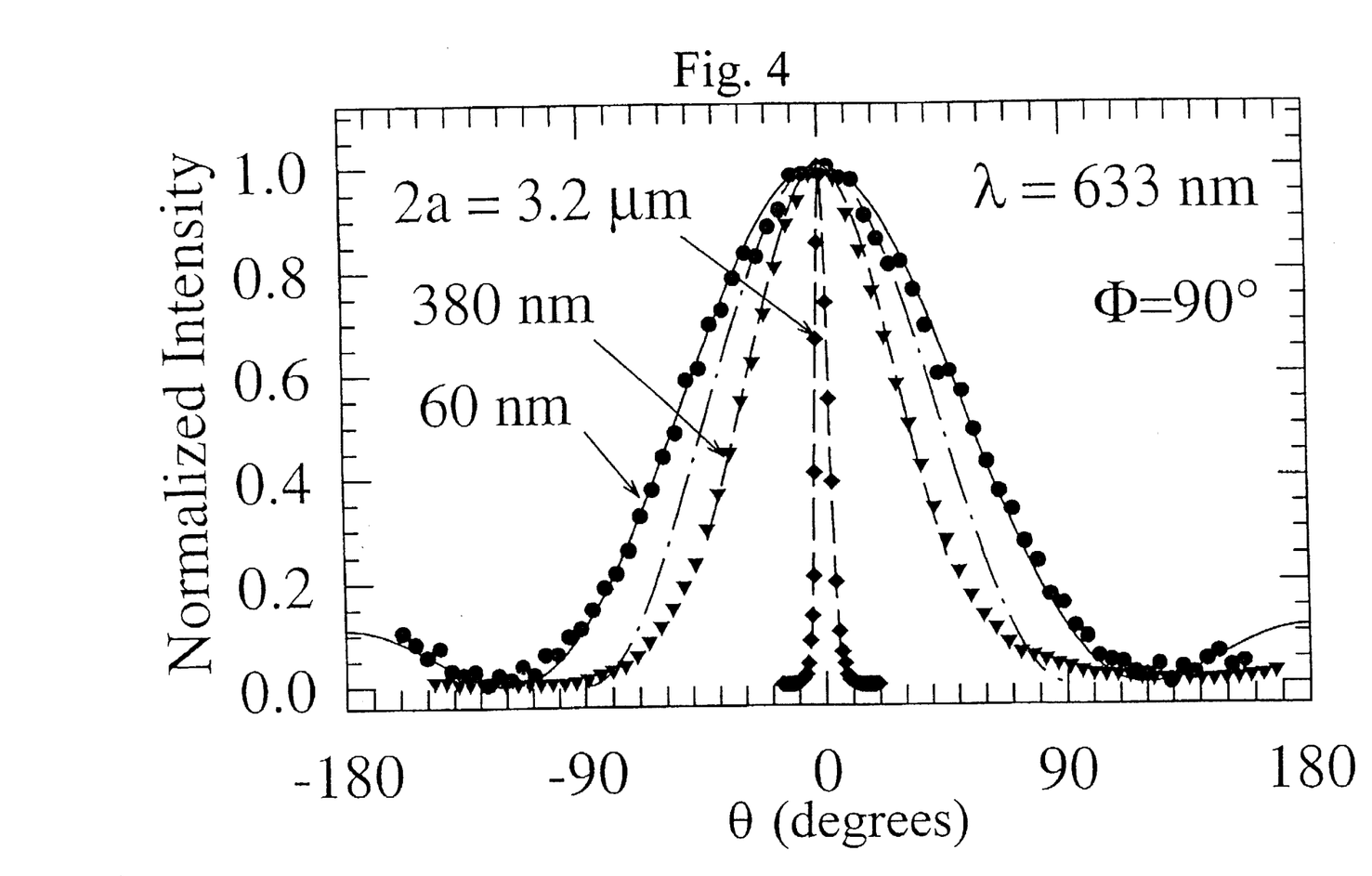
FIG. 4 Same as FIG. 3 but in this case with $\Phi=90°$, i.e. with the detector scanned in the plane YZ perpendicular to that XZ of the light polarization.

Results for the scans of I(θ) taken in the Φ=90° configuration are shown in FIG. 4.

For the 3.2 micron diameter aperture, the angular intensity distribution I(θ) for the Φ=90° scan was found to be identical in all respects to that for the Φ=0° scan within the accuracy of our measurement. That is to say, for this large aperture the angular distribution is independent of the polarization configuration i.e. independent of Φ. In other words, our results indicate that for large apertures, Kirchoff's diffraction theory holds as expected. As the aperture size was made smaller, the angular distribution I(θ) at Φ=90° was found to be different from the case at Φ=0. In particular, very little background photon signal was found in the Φ=90° geometry even for the smallest apertures. For the smallest tip diameter of 60 nm, a minimum was found at θ=±120°. This result was found to be reproducible for many tips of the same size.

Figure 5:
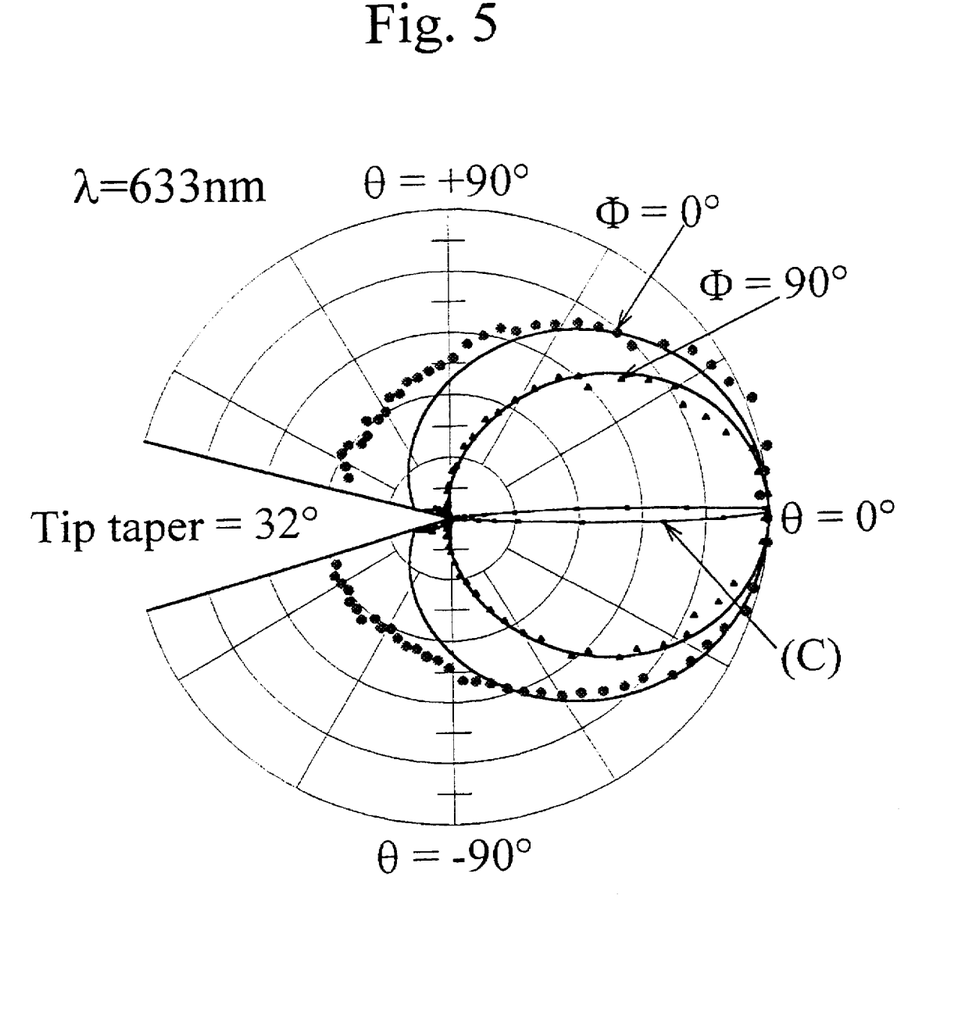
FIG. 5 Far-field angular scans polar plots for the $\Phi=0$ and $\Phi=90°$ polarization for a 60 nm tip. The 60 nm tip aperture is situated at the origin of the plot. The tip has a taper angle of 32° represented by the open cone on the left of the plot. The cone is a shadow region in which there is no signal. Full lines are the result of a simple dipole model calculation. The lines labeled (C) are shown for comparison and show measurements taken using a flat cleaved optical fiber (i.e. without a tip).

FIG. 5 shows, in an alternative representation to FIG. 3 and FIG. 4, the angular distribution functions I(θ) for both the Φ=0 and at Φ=90° scans. Results are shown for the 60 nm and 3.2 micron diameter apertures already described in connection with FIG. 3 and FIG. 4. The 380 nm diameter aperture shown in FIG. 3 and FIG. 4 has been omitted to keep FIG. 5 clear. FIG. 5 shows particularly clearly how the Φ=0 and the Φ=90° scans are substantially identical for the 3.2 micron aperture but become very different for the 60 nm aperture. Moreover, it can be clearly seen from FIG. 5 how, for the 60 nm aperture, significant intensities are distributed over the whole angular range measured from −164°<θ<164° showing that the transmitted light not only propagates in forward directions (i.e. in the angular range −90°<θ<90°) but also in backward directions. It can also be clearly seen in FIG. 5 that for the 60 nm aperture the backwardly directed propagation is much more pronounced in the Φ=0° scan than in the Φ=90° scan.

Results Discussion

It is noted that the significant instensity contributions measured for |θ|>90° are in obvious conflict with the theories developed for a circular hole in a thin metal plane (see Meixner and Andrejewski, Bethe and Bouwkamp ibid). These theories do not consider or even take into account the possibility of back propagation so that a comparison of our experimental results with these theories can only be made over the angular region −90°<θ<90°.

Bethe's prediction is that $I^{\|}_{Bethe}(θ)=\cos^2(θ)$ for −90°≤θ≤90° and is shown by the chain-dotted line in FIG. 4. In contrast to FIG. 4, Bethe's theory does at least follow the general trend of the experimental data, there is however a considerable deviation from the experimental data which precludes the use of this theory for quantitative purposes.

The theory of Bethe is thus clearly of no practical use for measuring apertures of NSOM tips.

Method

My method of the invention is now described with reference to a first embodiment.

My results indicate that the angular distribution becomes broader as the aperture diameter reduces. To investigate this further, I plotted $2θ_{1/2}$, the FWHM of I(θ), against tip diameter for the data collected in the Φ=90° configuration, i.e. for the scans of the type shown in FIG. 4. The use of the FWHM for Φ=90° has the advantage that the intensity distribution function I(θ) for Φ=90° is fitted well by a simple gaussian shape as mentioned above and, in particular, does not ride on a significant background as in the Φ=0 case. As throughout, the aperture sizes quoted are those obtained independently from SEM micrographs. Moreover, the wavelength of the probe light is 633 nm.

Figure 6:
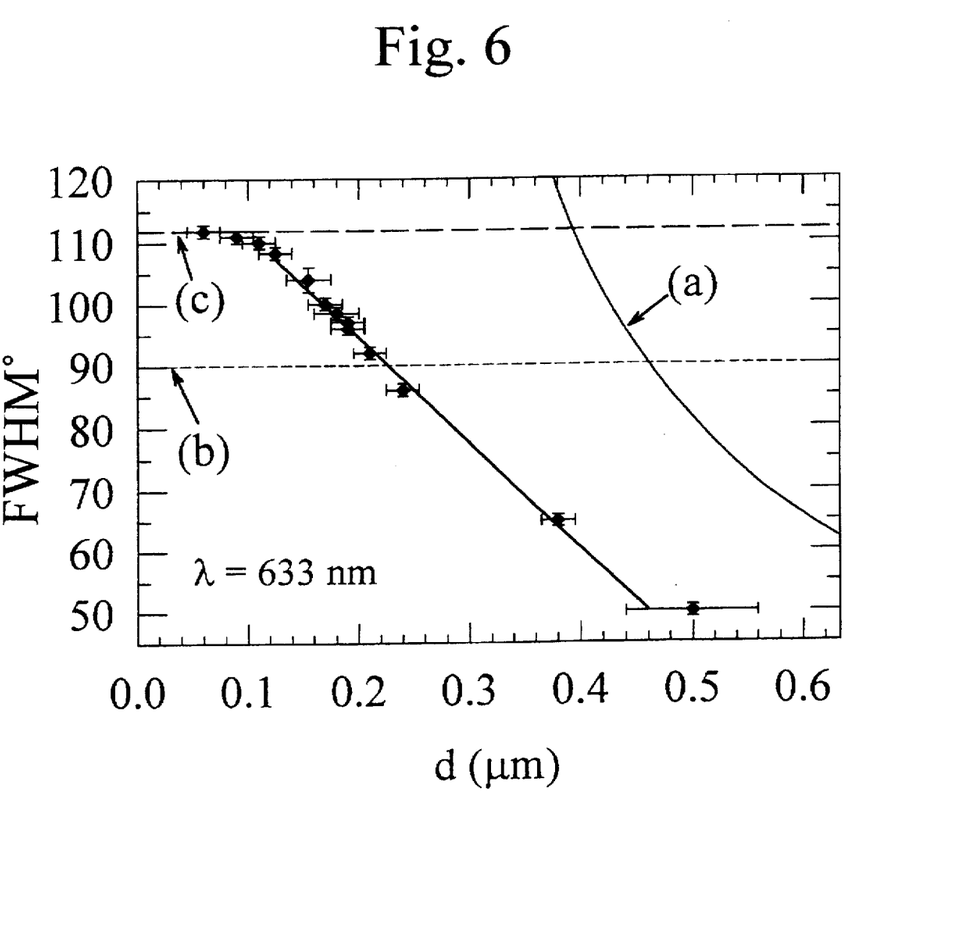
FIG. 6. Full width at half maximum (FWHM) of the angular distribution of the far-field intensity $I(\theta)$ as a function of the aperture diameter 'd'. All points come from measurements that were carried out in accordance with FIG. 4, i.e. at $\Phi=90°$. This data shows that far-field measurement allows the aperture size to be accurately determined down to approximately one sixth of the wavelength of the test radiation used (in this case down to approximately 106 nm). The line (a) is the prediction using Kirchoff's theory, the line (b) the small aperture limit theory of Bethe, and the line (c) that given by the simple model discussed in the text. The solid line is the best linear fit of the data points for tips with diameters larger than 110 nm.

The plot of FWHM at Φ=90° against aperture diameter 'd' is plotted in FIG. 6. The results are striking and surprising. They show that for the Φ=90° geometry there is a linear relationship between $2\theta_{1/2}$ and d over a range lying approximately between ⅙λ<d<¾λ. The solid straight line is a best fit for the points for diameters greater than d=110 nm. Our results therefore indicate that there is an approximately linear relationship between $2\theta_{1/2}$ and d/λ over the range specified above.

This phenomenological behaviour thus allows the tip diameter to be ascertained over a large part of the diameter range of practical interest.

However, for the tips with the smallest diameters measured, it can be seen from FIG. 6 that the points deviate from the phenomenological linear relationship between FWHM and 'd'. The results for these smallest diameter tips indicate that the FWHM tends towards a constant value of approximately 112°. To try to understand the behaviour for these smallest tip diameters I performed the further analysis described below.

Inspired by Bethe's far-field equivalence existing between small apertures and a combination of two dipoles, I sought the best linear combination of the two radiating dipoles M and P.

Figure 8A:
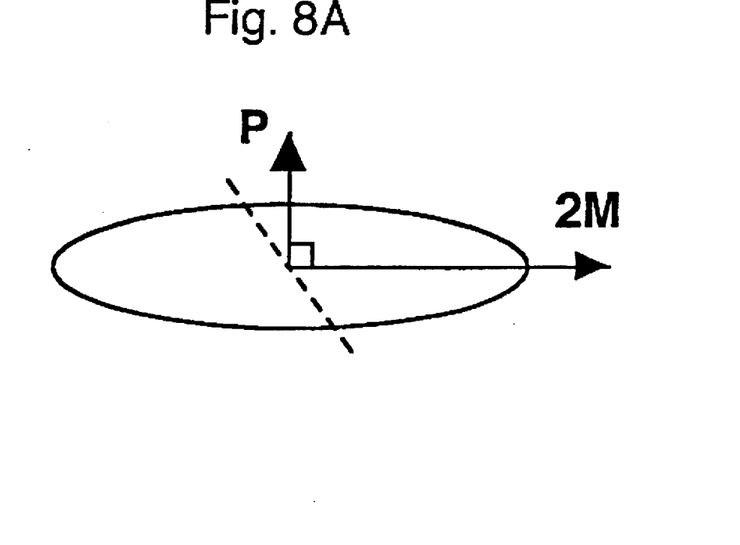
Figure 8B:
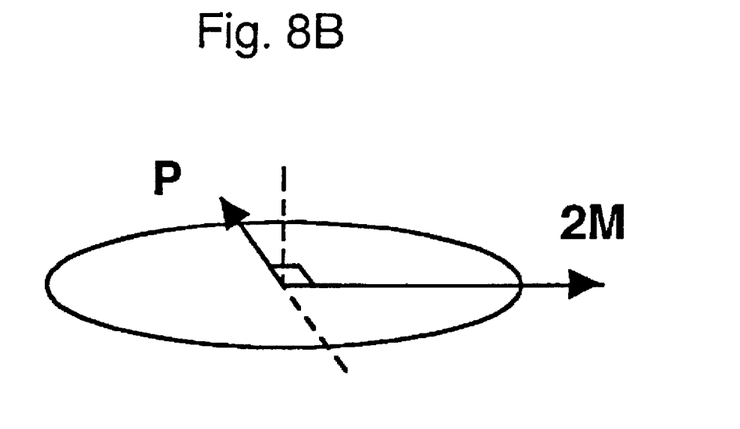

To my surprise I found that, for the data from the aperture of 60 nm diameter, the fit is perfect for a choice of M and P identical in magnitude to the theory of Bethe but with P lying in the XY plane aperture i.e. in the plane parallel to the field $E_0$ of the radiation in the fiber before the aperture. P is parallel to the electrical field component $E_0$ of the radiation before the tip aperture. The orientation of the vectors relative to each other and relative to the plane of the aperture are shown schematically in FIG. 8A for the theory of Bethe and FIG. 8B according to our phenomenological theory.

My surprising result is therefore that $$P = \alpha a^3/(3\pi) E_0 \text{ and } M = \alpha 2a^3/(3\pi)(\mu_0 c) H_0 \quad (1)$$

where 'a' is the aperture radius and α is a proportionality constant. The corresponding intensity I(θ) is then given by the amplitude of the Poynting vector S normalized in units of solid angle and is $$S = \alpha^2 1/(36\pi^3)(a/R)^2(ka)^4 [2(\mu_0 c) u \times H_0 + u \times u \times E_0]^2 \cdot u \quad (2)$$

where u is the unit vector pointing from the tip to the detector. The amplitude of S is proportional to the normalized intensity I(θ).

Specializing to the case Φ=90° equation 2 leads to $$I(\theta) = [(2\cos\theta + 1)/3)]^2 \quad (3)$$

and in the case Φ=0° to $$I(\theta) = [(\cos\theta + 2)/3)]^2 \quad (4)$$

so that in the case of Φ=90° the FWHM is given by $$2\theta_{1/2} = 166° \quad (5)$$

and in the case of Φ=0° the FWHM is given by $$2\theta_{1/2} = 112° \quad (6)$$

That is to say, for both Φ=0° and Φ=90° geometries, my phenomenological theory predicts that $2\theta_{1/2}$ is independent of 'ka' i.e. independent of 'd/λ'.

The full lines in FIG. 3 and in FIG. 4 are calculated from equation (4) and (3) respectively for an aperture diameter of 60 nm. As can be seen from FIG. 4, there is an excellent agreement with the experimental data points for the whole angular range. In FIG. 3 on the other hand the agreement between theory and experiment is close for forward propagation and in particular in the range −75°≤θ≤75° whereas there is a considerable divergence for the backward propagation directions −90°>θ>90°.

In both FIG. 3 and FIG. 4 the FWHM predicted by equations (5) and (6) respectively are seen to be in excellent agreement with the experimental data.

In further calculations (not shown), the relative orientation of the two dipoles M and P was varied to attempt to find a still better fit for the Φ=0° data, in particular at large θ. However, no selection could be found which improved the fit for the Φ=0° data, without worsening the fit for the Φ=90° data.

Now returning to FIG. 6, the straight horizontal dashed line labeled (c) is that calculated according to equation (3). That is to say, our theory described above is in excellent agreement with the data points relating to the smallest tip diameters we have measured.

For the sake of comparison, we have also reproduced the theory of Bethe in FIG. 6 with the dashed horizontal line labeled (b). As can be seen, there is a substantial quantitative discrepancy between Bethe's theoretical prediction and the experimental results. The solid line in FIG. 6 labeled (a) is that calculated in the large aperture limit d>>λ according to Kirchoff's theory. As expected, Kirchoff's theory gives a completely wrong prediction since it is being applied here to the regime d<λ when it is only applicable in the regime d>>λ.

The first embodiment of the method of the invention is thus summarised as follows:

(1) Select a tip for investigation.

(2) Measure in far field the FWHM of the tip using light of a wavelength λ and in the Φ=90° configuration as described above, using for example the apparatus of FIG. 1A.

(3) If the FWHM is around 112° then an upper limit of approximately λ/6 can be placed on the tip diameter.

Figure 7:
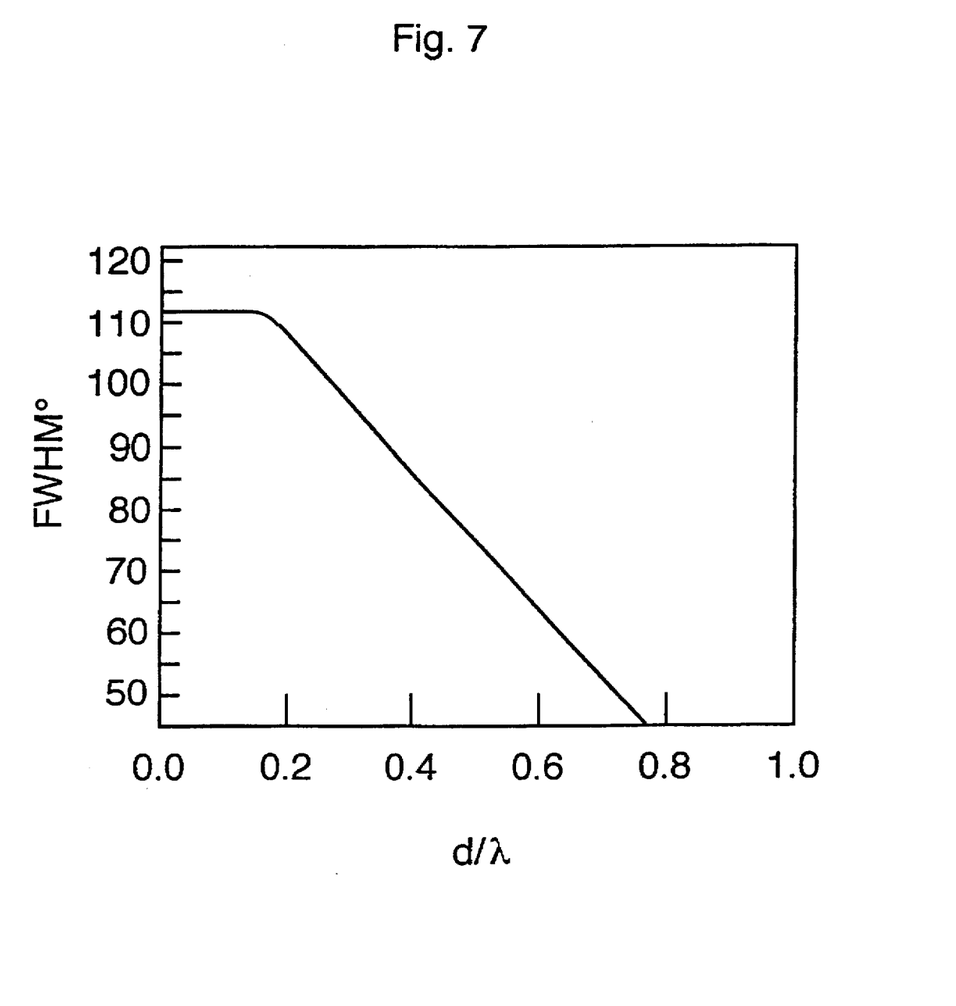
FIG. 7 Calibration curve summarizing the results of our investigations for $\Phi=90°$, showing the relationship between FWHM in degrees and $d/\lambda$. This graph can be used to establish tip diameter information from a measurement of FWHM.

(4) If, on the other hand, the FWHM has a value lying approximately between 112° and 50°, a quantitative value of the tip diameter d can be deduced directly from reading off FIG. 7.

This method and apparatus thus allows either a quantitative measurement of the tip diameter or, for small tips, an upper limit to be placed on the tip diameter.

As mentioned above, if the measured FWHM is around 112° only an upper limit of approximately λ/6 can be placed on the tip diameter but no express value for the tip diameter is deducable. This is because the FWHM becomes essentially invariant or at least comparitively insensitive to the tip diameter for tip diameters of less than approximately d=λ/6, i.e., in terms of FIG. 7, the data point lies on the horizontal portion of the calibration curve.

If this is considered insufficient, the method of the first embodiment can be supplemented by the following additional step:

(5) repeat the steps (2) to (4) above but using a wavelength λ which is shorter than that used before in order to try to force the data point to lie on the inclined portion of the calibration curve so that a quantitative value of the tip diameter can then be deduced.

How short a wavelength can be used will dearly be dependent on the waveguiding properties of the optical fiber, micropipette etc. Ideally, the measurement should at least initially be carried out with a wavelength equal to or close to that for which the near-field optical microscope will be used, since this ensures that, if there is any wavelength dependence on the effective aperture size, the measured aperture size is the actual aperture size which exists when the microscope is used. Only if this initial measurement indicates that $d<\lambda/6$ need a remeasurement with a shorter wavelength be considered.

To give some concrete examples, the $\lambda/6$ value discussed above corresponds to a minimum quantifiably measurable aperture diameter of:

| | |
|---|---|
| $d_{min} = 106$ nm | for the HeNe $\lambda = 633$ nm laser line; |
| $d_{min} = 76$ nm | for the Argon ion $\lambda = 458$ nm laser line; and |
| $d_{min} = 54$ nm | for the HeCd $\lambda = 325$ nm laser line, | so that the method of the invention allows a quantitative measurement of tip diameters down to approximately 50 to 100 nm depending on the wavelength of the light used for performing the measurement.

Similarly, laser and other light sources are available also at longer wavelengths such as Nd:YAG lasers in the near infra-red region which would, in particular, be useful for near-field optical microscopes operating in the near infra-red region or for measuring larger tip diameters, perhaps for a non-near-field optical microscope i.e. for a scanning probe optical microscope with a tip diameter larger than the wavelength of operation.

However, our results indicate that there are clearly other embodiments of the method of the invention i.e. there are other methods of deducing the tip diameter from a far-field measurement of the angular intensity distribution.

For example, our investigations show that the intensity $I(\theta)$ in backwards propagation directions $-90°>\theta>90°$ for the configuration $\Phi=0$ is a sensitive measure of the tip diameter. In FIG. 3 it can be seen that $I(\theta=165°)/I(\theta=0°)=0.38$ for the 60 nm tip whereas $I(\theta=165°)/I(\theta=0°)=0.07$ for the 380 nm tip. In a second embodiment of the invention, the tip diameter information is thus deduced in accordance with the ratio of the intensity for some backwards propagation direction or range of directions $-90°>\theta>90°$ to the intensity for forward propagation at for example $\theta=0°$.

Moreover, it can be seen from FIG. 3 that the width of $I(\theta)$ is dependent on the tip diameter in the $\Phi=0°$ configuration. Because of the significant back propagation intensity, which is substantially invariant with angle $\theta$, the full width at ¾ maximum (FW¾M) could be used here instead of the FWHM. Instead, in a third embodiment of the method of the invention, the first embodiment is followed with the differences that the measurement is performed at $\Phi=0$ and instead of the FWHM one measures instead the full width at three quarters maximum or the like. A measurement of FWHM would still however be possible as in the first embodiment.

Furthermore, it is noted that we have only performed $I(\theta)$ scans in the two polarization configurations $\Phi=0$ and $\Phi=90°$. It is clear that further embodiments of the method of the invention can be developed performing scans at some other value of $\Phi$ and still further embodiments with randomised polarization.

Additionally, the linear relationship between $d/\lambda$ and the FWHM or other similar parameter which our experiments show to occur for our tips, may not hold for tips manufactured differently. For example, when different reflective coatings or methods of optical coating are used to prepare the tips, or when different types of optical fibers or even micropipettes are used there may be a different relationship between $d/\lambda$ and the FWHM or other similar parameter. I note that the optical fibers used here were all of the same type and had a refractive index of approximately 1.8. What is important for carrying out the method of the invention is merely that, for a particular type of tip manufactured in a particular way, there is some clear functional relationship between $d/\lambda$ and a far-field optical parameter derived from the angular intensity distribution of the light emitted from such tips.

Nevertheless, I was curious to investigate how universal the relationship illustrated in FIG. 7 is. To this end, I performed further measurements to test the effect of variation of the thickness of the aluminum film deposited on the tip. I prepared several tips with aluminum films of thickness 170 nm, instead of the 120 nm film thickness used for the tips described above. I then repeated the measurements described above for these new tips and plotted the points on FIG. 6 (not shown). The results indicated no discernable variation from the points relating to the tips having the aluminum films of 120 nm in thickness. The relationship illustrated in FIG. 7 is therefore not specific to a single thickness of reflective coating and thus appears to have some measure of universality, at least for film thicknesses over some considerable range.

In short, our above-described investigations have made it clear that there are a plethora of far-field measurements of the whole of or of particular aspects of the angular intensity distribution which, with suitable analysis either theoretical or experimental or both, will allow information about the aperture diameter to be ascertained. All such techniques fall within the scope of the present invention as claimed in the claims.

What I claim is:

1. A method for application to a tip piece suitable for use in near-field optical microscopy, the tip piece having a proximal end and a distal end, there being an optically transmissive aperture of a diameter ($d=d_r$) to be characterized situated at said proximal end and wherein input light is couplable into said distal end for emission from said proximal end as output light distributed in far field over an angular intensity distribution function ($I\{\theta\}$), said method comprising the steps of:

coupling in input probe light of a preselected wavelength ($\lambda$) into said distal end;

obtaining a first datum ($I\{\theta_1\}$) from a first far-field intensity measurement of said output light emitted at a first preselected angle ($\theta_1$) from the aperture;

obtaining at least a second datum ($I\{\theta_2\}$) from at least a second far-field intensity measurement of said output light emitted at at least a second preselected angle ($\theta_2$) from the aperture, said second preselected angle being different from said first preselected angle;

deducing dimensional information relating to said diameter ($d_r$) from said first and said at least second data by applying them to a predetermined function relating the far-field angular intensity distribution function ($I\{\theta\}$) to diameter (d), said function covering values of diameter (d) less than said preselected wavelength ($\lambda$).

2. The method of claim 1, wherein, before coupling in said input light into said distal end, the step is performed of polarising said input light along a first direction and wherein, before said first and at least second far-field intensity measurements, the step is performed of polarising said output light along a second direction.

3. The method of claim 2, wherein said first and second directions are approximately perpendicular to one another ($\Phi \approx 90°$).

4. The method of claim 2, wherein said first and second directions are approximately parallel to one another ($\Phi \approx 0°$).

5. The method of claim 1, wherein said predetermined function includes components of the angular intensity distribution function (I{θ}) for output light emitted in a backwards direction (I{θ}: |θ|>90°) from the aperture.

6. The method of claim 1, wherein said first preselected angle ($\theta_1$) is preselected so that said first datum(I{$\theta_1$}) relates to output light emitted in a forwards direction (|θ|<90°)) and said second preselected angle ($\theta_2$) is preselected so that said second datum(I{$\theta_2$}) relates to output light emitted in a backwards direction (|θ|>90°) and wherein said predetermined function relates a ratio of said first and second data to diameter (d).

7. A method for application to a tip piece suitable for use in near-field optical microscopy, the tip piece having a proximal end and a distal end, there being an optically transmissive aperture of a diameter (d=$d_r$) to be characterised situated at said proximal end and wherein input light is couplable into said distal end for emission from said proximal end as output light distributed in far field over an angular intensity distribution function (I{θ}), said method comprising the steps of:

coupling in input probe light of a preselected wavelength (λ) into said distal end;

obtaining a first datum (I{$\theta_1$}) from a first far-field intensity measurement of said output light emitted at a first preselected angle ($\theta_1$) from the aperture;

obtaining at least a second datum (I{$\theta_2$}) from at least a second far-field intensity measurement of said output light emitted at at least a second preselected angle ($\theta_2$) from the aperture, said second preselected angle being different from said first preselected angle;

deducing dimensional information relating to said diameter ($d_r$) from said first and said at least second data by applying them to a predetermined function relating the far-field angular intensity distribution function (I{θ}) to diameter (d), wherein said predetermined function relates the full width of the angular intensity distribution function (I{θ}) at a preselected proportion of the maximum value of the angular intensity distribution function (I{θ}) to diameter (d).

8. The method of claim 7, wherein said preselected proportion of the maximum value of the angular intensity distribution function (I{θ}) is approximately one half, so that said predetermined function corresponds to a full width half maximum (FWHM) of the angular intensity distribution function (I{θ}).

9. The method of claim 8, wherein said predetermined function includes a portion in the range d/λ=0.18 to 0.8 over which the full width half maximum is substantially equal to −114d/λ+132, where d signifies diameter and λ signifies wavelength.

10. The method of claim 7, wherein, before coupling in said input light into said distal end, the step is performed of polarising said input light along a first direction and wherein, before said first and at least second far-field intensity measurements, the step is performed of polarising said output light along a second direction.

11. The method of claim 10, wherein said first and second directions are approximately perpendicular to one another ($\Phi \approx 90°$).

12. The method of claim 10, wherein said first and second directions are approximately parallel to one another ($\Phi \approx 0°$).

13. A test apparatus for analyzing a tip piece suitable for use in near field optical microscopy, the tip piece having a proximal end and a distal end, wherein an optically transmissive aperture of a diameter (d=$d_r$) to be characterized is situated at said proximal end, the test apparatus comprising:

a holder for holding the tip piece so as to position the aperture at a prespecified location (O) in relation to the test apparatus;

a light source (L) for generating input light of a preselected wavelength (λ);

coupling-in means (C) for coupling said input light into said distal end of said tip piece, said input light passing through the tip piece and being emitted from said proximal end as output light;

a detector (D) for detecting the intensity (I{$\theta_m$}) of the output light emitted at a given angle ($\theta_m$) from said aperture and generating a corresponding signal indicative thereof;

motor means for moving the detector (D) to different angles (θ) around the location (O);

data acquisition means for receiving said signal from the detector (D) and correlating said signal with the angle (θ) at which it was measured so as to generate angular intensity data (I{$\theta_{m,n} \ldots$ });

processing means for deducing dimensional information relating to said diameter ($d_r$) from said angular intensity data (I{$\theta_{m,n} \ldots$ }) by applying said intensity data to a predetermined functional relationship between a characteristic of the far-field angular intensity distribution function (I{θ}) and diameter (d), said function covering values of diameter (d) less than said preselected wavelength (λ).

14. The test apparatus of claim 13, further comprising a polarisation analyser (A) positioned between said prespecified location (O) and the detector (D).

15. The test apparatus of claim 13, further comprising a polariser (P) positioned between the light source (L) and the coupling-in means (C).

16. A test apparatus for analyzing a tip piece suitable for use in near field optical microscopy, the tip piece having a proximal end and a distal end, wherein an optically transmissive aperture of a diameter (d=$d_r$) to be characterized is situated at said proximal end, the test apparatus comprising:

a holder for holding the tip piece so as to position the aperture at a prespecified location (O) in relation to the test apparatus;

a light source (L) for generating input light of a preselected wavelength (λ);

coupling-in means (C) for coupling said input light into said distal end of said tip piece, said input light passing through the tip piece and being emitted from said proximal end as output light;

a first detector ($D_1$) for detecting the intensity (I{$\theta_m$}) of the output light emitted at a first preselected angle ($\theta_m$) from said aperture and generating a corresponding first signal indicative thereof;

at least a second detector ($D_2$) for detecting the intensity (I{$\theta_n$}) of the output light emitted at a second preselected angle ($\theta_n$) from said aperture and generating a corresponding second signal indicative thereof, said second preselected angle being different from said first preselected angle;

data acquisition means (DAU) for receiving at least said first and second signals from said first and second detectors respectively so as to generate angular intensity data (I{$\theta_{m,n} \ldots$ });

processing means for deducing dimensional information relating to said diameter ($d_r$) from said angular intensity data ($I\{\theta_{m,n} \ldots\}$) by applying said angular intensity data to a predetermined functional relationship between a characteristic of the far-field angular intensity distribution function ($I\{\theta\}$) and diameter (d), said function covering values of diameter (d) less than said preselected wavelength ($\lambda$).

17. The test apparatus of claim 16, further comprising at least a first and a second polarisation analyser ($A_1, A_2 \ldots$) positioned between said prespecified location (O) and the respective detectors ($D_1, D_2 \ldots$).

18. The test apparatus of claim 16, further comprising a polariser (P) positioned between the light source (L) and the coupling-in means (C).

* * * * *